(12) United States Patent
Guo et al.

(10) Patent No.: US 12,718,548 B2
(45) Date of Patent: Aug. 25, 2026

(54) METHOD FOR FINETUNING A LARGE LANGUAGE MODEL FOR A VISUAL NAVIGATION TASK

(71) Applicant: Robert Bosch GmbH, Stuttgart (DE)

(72) Inventors: Yuliang Guo, Redwood City, CA (US); Christian Juette, Redwood City, CA (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 18/785,048

(22) Filed: Jul. 26, 2024

(65) Prior Publication Data

US 2026/0030879 A1 Jan. 29, 2026

(51) Int. Cl.
*G06V 10/82* (2022.01)
*G06V 10/771* (2022.01)
*G06V 10/778* (2022.01)

(52) U.S. Cl.
CPC ............ *G06V 10/82* (2022.01); *G06V 10/771* (2022.01); *G06V 10/7788* (2022.01)

(58) Field of Classification Search
CPC ... G06V 10/82; G06V 10/771; G06V 10/7788
See application file for complete search history.

(56) References Cited

U.S. PATENT DOCUMENTS 11,927,965 B2 * 3/2024 Ebrahimi Afrouzi ........................ G06F 3/04845
12,276,507 B2 * 4/2025 Meng ..................... G06N 3/045
12,393,197 B2 * 8/2025 Banerjee .............. G05D 1/0238
2020/0151277 A1 * 5/2020 Fisher .................. G06F 40/284
2023/0086735 A1 * 3/2023 Yan ....................... G06F 16/735 382/190

FOREIGN PATENT DOCUMENTS

CN 118258407 A * 6/2024 ............ G01C 21/20

OTHER PUBLICATIONS

Shah et al., "ViNT: A Foundation Model for Visual Navigation," 7th Conference on Robot Learning (CoRL 2023), Oct. 24, 2023, pp. 1-25, arXiv:2306.14846v2.

(Continued)

*Primary Examiner* — Tom Y Lu
(74) *Attorney, Agent, or Firm* — Maginot, Moore & Beck LLP

(57) ABSTRACT

A method for finetuning a pretrained language model for performing a visual navigation task is described. Scene data is provided that describes a plurality of scenes. Scene graphs that represent the plurality of scenes are derived based on the scene data. For different combinations of a given starting room and target object, a ground truth shortest path from the starting room to the target object in the scene is determined based on the scene graph. Based on the scene data and the scene graphs, natural language prompts are derived that prompt the language model to predict, given a current room and the target object in the scene, a next navigation step of a shortest path from the starting room to the target object in the scene. Together, the natural language prompts and the ground truth shortest paths are used to finetune the pre-trained language model.

20 Claims, 9 Drawing Sheets

(56) References Cited

OTHER PUBLICATIONS

Shah et al., “Navigation with Large Language Models: Semantic Guesswork as a Heuristic for Planning,” 7th Conference on Robot Learning (CoRL 2023), Oct. 16, 2023, pp. 1-18, arXiv:2310.10103v1.
Yu et al., “L3MVN: Leveraging Large Language Models for Visual Target Navigation,” Dec. 25, 2023, 7 pages, arXiv:2304.05501v2.
Rana et al., “SayPlan: Grounding Large Language Models using 3D Scene Graphs for Scalable Robot Task Planning,” 7th Conference on Robot Learning (CoRL 2023), 2023, pp. 1-50.
Gu et al., “ConceptGraphs: Open-Vocabulary 3D Scene Graphs for Perception and Planning,” Sep. 28, 2023, pp. 1-11, arXiv:2309.16650v1.
Rosinol et al., “3D Dynamic Scene Graphs: Actionable Spatial Perception with Places, Objects, and Humans,” Jun. 16, 2020, pp. 1-11, arXiv:2002.06289v2.
StanfordVL, “Full Gibson Environment Dataset,” 2018, pp. 1-6, GitHub, https://github.com/StanfordVL/GibsonEnv/blob/master/gibson/data/README.md.

* cited by examiner

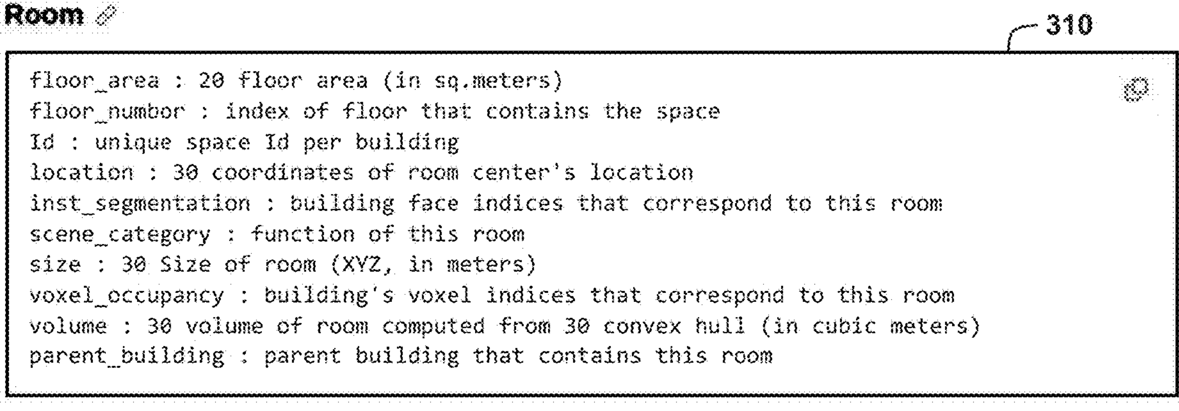

Object

320 action_affordance : list of possible actions
floor_area : 2D floor area in sq.meters
surface_coverage : total surface coverage in sq.meters
class_* : object label
id : unique object id per building
location : 3D coordinates of object center's location
material : list of main object materials
size : 3D Size of object (XYZ, in meters)
inst_segmentation : building face indices that correspond to this object
tactil_texture*** : main tactile texture (can be None)
visual_texture*** : main visible texture (can be None)
volume : 3D volume of object computed from 30 convex hull (cubic meters)
voxel_occupancy : building's voxel indices that correspond to this object
parent_room : parent room that contains this object

```
{
   "gt_shortest_path_length": 10.517566688249708,
   "gt_shortest_path_trajectory": [
      "room_5",
      "room_3",
      "room_14",
      "object_24"
   ],
   "llm_shortest_path_length": 13.824662503056698,
   "llm_shortest_path trajectory": [
      "room_5",
      "room_2",
      "room_4",
      "room_15",
      "room_12",
      "object_22"
   ],
   "spl_by_distance": 0.8075116484424367,
   "spl_by_steps": 0.6666666666666666
}
```

FIG. 6

610 — You are traveling in a new unknown environment represented as a graph. There are "object" nodes and "room" nodes in the environment. Each object node is connected to its closest neighboring objected nodes (at most 3). Each "room" node is also connected to its closest room nodes (at most 3). For each room node there is also an edge that goes from the room node to the closest object node in the room and an edge that goes from the closest object node to the room node. At a room node, you don't observe all of the object nodes in the room, but only the closest object node, so you might consider exploring the room by first traveling to the closest node in the room.

620 — Your task is to find an object in the category "chair" with the shortest path.

630 — The current place is room_9 with information {'type': 'room', 'floor_area': 10.53, 'floor_number': 'A', 'id': 9, 'location': array([3.9, 4.07, 1.21]), 'scene_category': 'kitchen', 'size': array([2.81, 3.21, 2.47]), 'volume': 18.09, 'parent_building': 2}

640 — You have visited places ['room_9']

It has 4 neighbor places:

Neighbor place number 1 is room_7 with information {'type': 'room', floor_area': 8.19, floor_number: 'A', 'id': 7, 'location': array([4.47. 215, 1.22]), 'scene_category': 'corridor', 'size': array([3.28.1.75, 2.46]), 'volume': 9.72, 'parent_building': 2}

Neighbor place number 2 is room_5 with information {'type': 'room', 'floor_area': 7.16, floor_number: 'A', 'id': 5, 'location': array([1.79, 3.48, 1.23]), 'scene_category': 'corridor', 'size': array([1.93, 2.56, 2.45]), 'volume': 7.75, 'parent_building': 2}

Neighbor place number 3 is room_8 with information {'type': 'room', 9.49, floor_number: 'A', 'id': 8, 'location': array([3.94, 6.68, 1.21]), 'scene_category': 'dining_room, 'size': array([2.66. 2.34, 2.46]), 'volume': 14.28, 'parent_building': 2}

Neighbor place number 4 is object_5 with information {'type': 'object', 'action_affordance': ['wash', 'clean'], 'floor_area': 2.32, 'surface_coverage': 0.56, 'class_': 'sink', 'id': 5, 'location': array([4.75. 4.08, 0.8]), 'material': ['ceramic', None], 'size': array([0.59, 0.67, 0.22]), 'tactile_texture': None, 'visual_texture': None, 'volume': 0.05, 'parent_room': 9}

610 — Please input your desired place to go to next from [1, 2, 3, 4].

FIG. 7

610

You are traveling in a new unknown environment represented as a graph. There are "object" nodes and "room" nodes in the environment. Each object node is connected to its closest neighboring objected nodes (at most 3). Each "room" node is also connected to its closest room nodes (at most 3). For each room node there is also an edge that goes from the room node to the closest object node in the room and an edge that goes from the closest object node to the room node. At a room node, you don't observe all of the object nodes in the room, but only the closest object node, so you might consider exploring the room by first traveling to the closest node in the room.

620

Your task is to find an object in the category "chair" with the shortest path.

630

The current place is room_9 with information {'type': 'room', 'floor_area': 10.53, 'floor_number': 'A', 'id': 9, 'location': array([3.9, 4.07, 1.21]), 'scene_category': 'kitchen', 'size': array([2.81, 3.21, 2.47]), 'volume': 18.09, 'parent_building': 2}

640

You have visited places ['room_9']

It has 4 neighbor places:

Neighbor place number 1 is room_7 with information {'type': 'room', floor_area': 8.19, floor_number: 'A', 'id': 7, 'location': array([4.47. 215, 1.22]), 'scene_category': 'corridor', 'size': array([3.28.1.75, 2.46]), 'volume': 9.72, 'parent_building': 2}

Neighbor place number 2 is room_5 with information {'type': 'room', 'floor_area': 7.16, floor_number: 'A', 'id': 5, 'location': array([1.79, 3.48, 1.23]), 'scene_category': 'corridor', 'size': array([1.93, 2.56, 2.45]), 'volume': 7.75, 'parent_building': 2}

Neighbor place number 3 is room_8 with information {'type': 'room', 9.49, floor_number: 'A', 'id': 8, 'location': array([3.94, 6.68, 1.21]), 'scene_category': 'dining_room, 'size': array([2.66. 2.34, 2.46]), 'volume': 14.28, 'parent_building': 2}

Neighbor place number 4 is object_5 with information {'type': 'object', 'action_affordance': ['wash', 'clean'], 'floor_area': 2.32, 'surface_coverage': 0.56, 'class_': 'sink', 'id': 5, 'location': array([4.75. 4.08, 0.8]), 'material': ['ceramic', None], 'size': array([0.59, 0.67, 0.22]), 'tactile_texture': None, 'visual_texture': None, 'volume': 0.05, 'parent_room': 9}

610

Please input your desired place to go to next from [1, 2, 3, 4].

710

Analyze your current option and give me a complete reasoning that explains why place number 3 is the correct option. Output {'choice': "room_8"} in the end.

FIG. 8

Given the task and the current place information, I can provide some guidance:

1. room_7 - A corridor. While corridors might connect to rooms with chairs, it's less likely for a chair to be directly in a corridor.
2. room_5 - Another corridor. Similar to room_7, this is less likely to contain a chair directly.
3. room_8 - A dining room. Dining rooms are typically where you'll find chairs. This is a good place to explore next.
4. object_5 - A sink. This isn't a chair, and while it's an object in the current room (kitchen), the fact that it's a sink means there's no direct relation to finding a chair.

Given the information, I'd recommend going to the dining room (room_8) next, as it's most likely to contain chairs. Therefore, the desired place should be 3.

FIG. 9

METHOD FOR FINETUNING A LARGE LANGUAGE MODEL FOR A VISUAL NAVIGATION TASK

FIELD

The devices and methods disclosed in this document relate to machine learning and, more particularly, to finetuning a large language model for a visual navigation task.

BACKGROUND

Unless otherwise indicated herein, the materials described in this section are not admitted to be the prior art by inclusion in this section.

One type of visual navigation task is one in which, in a new unknown environment, an agent must navigate to a desired object within the environment based on observations about the environment. There are three major variations of this type of visual navigation task: (1) goal image finding in which, given a goal specified as a target image, an agent is to determine the next navigation step based on the past RGB images; (2) language goal finding in which, given a goal specified in language, an agent is to determine the next navigation step based on observations in RGB (D) input and an ego pose in visited portions of the environment; and (3) category goal finding in which, given a goal specified with a category name, an agent is to determine the next navigation step to approach the closest object belonging to the category, based on observations in RGB (D) input and an ego pose in visited portions of the environment.

Unlike language understanding or object classification, visual navigation has to handle natural ambiguity and incomplete information. Room layouts can be different from place to place without definite rules to follow, and real-world room layout data is rather rare for training such models. Accordingly, an approach for providing a model for performing such a visual navigation task effectively, in the absence of very large training datasets, would be advantageous.

SUMMARY

A method for finetuning a language model is disclosed. The method comprises providing, in a memory, a scene graph representing a scene, the scene graph comprising a plurality of nodes and a plurality of edges interconnecting the plurality of nodes, the plurality of nodes representing a plurality of rooms in the scene and a plurality of objects in the scene. The method further comprises selecting, with a processor, (i) a starting room from the plurality of rooms and (ii) a target object, the target object being an object type or a particular object from the plurality of objects. The method further comprises determining, with the processor, based on the scene graph, a ground truth shortest path from the starting room to the target object in the scene, the ground truth shortest path being defined by a first sequence of connected nodes in the scene graph that represent a first sequence of navigation steps to navigate the scene from the starting room to the target object. The method further comprises generating, with the processor, a natural language prompt configured to prompt a language model to predict, given a current room and the target object in the scene, a next node in the first sequence of connected nodes that define the ground truth shortest path from the starting room to the target object in the scene. The method further comprises finetuning the language model using the natural language prompt and the ground truth shortest path.

BRIEF DESCRIPTION OF THE DRAWINGS

The foregoing aspects and other features of the system and method are explained in the following description, taken in connection with the accompanying drawings.

FIG. 4 shows exemplary metadata that may be included in scene data with respect to each room and object of a scene.

FIG. 6 shows exemplary outputs during a finetuning process.

FIG. 7 shows an exemplary natural language prompt for prompting the language model.

FIG. 8 shows an exemplary modified natural language prompt for finetuning the pretrained language model.

FIG. 9 shows an exemplary output from the language model in response to the exemplary natural language prompt.

DETAILED DESCRIPTION

Figure 1:
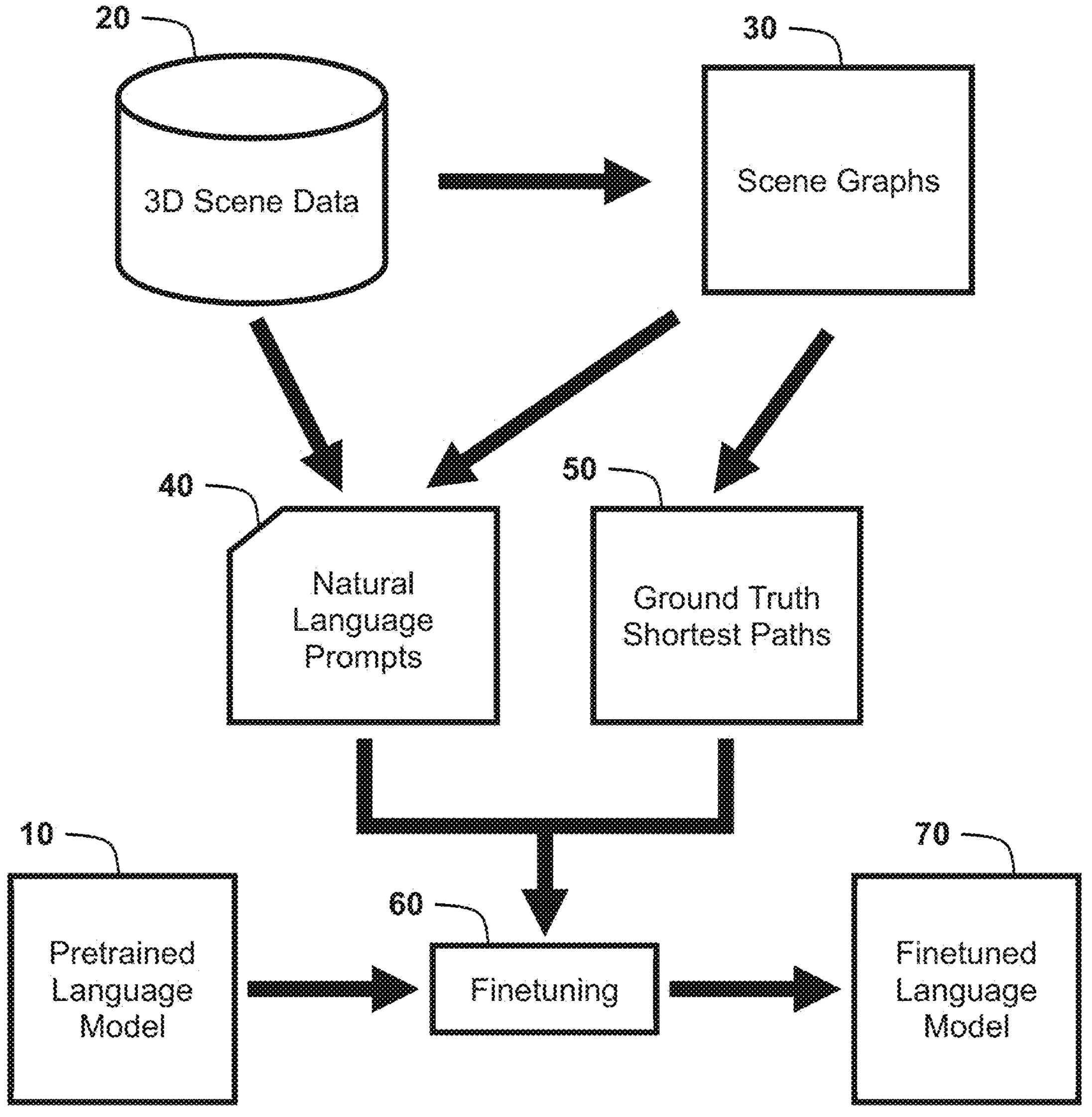
FIG. 1 summarizes a workflow for finetuning a pretrained language model for performing a visual navigation task.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Overview

FIG. 1 summarizes a workflow for finetuning a pretrained language model 10 for performing a visual navigation task. In particular, the visual navigation task that is the focus of this disclosure is one in which, given a starting room and a target object in a scene, a next navigation step is determined that will enable an agent to navigate the scene to reach the target object with a shortest path. In this visual navigation task, only limited information about the scene is available for decision making. In other words, the agent does not have complete knowledge of the scene, only knowledge of the immediate surroundings of the current location within the scene.

The workflow advantageously leverages a pretrained language model 10. In general, the pretrained language model 10 is a large language model (LLM) such as OpenAI's GPT 3.5, GPT 3.5-turbo, or GPT-4 models or a similar Transformer-based neural network model. However, the pretrained language model 10 may take the form of any machine learning model. Such pretrained large language models have been previously trained for general purpose functionality and capture human common sense from a large amount of training data. However, such pretrained large language models are not reliable for visual navigation tasks.

Thus, the workflow adopts a process for generating a plurality of finetuning examples for finetuning the pretrained language model 10 to more reliably apply the common sense learned by the pretrained language model 10 to perform a visual navigation task in a new environment.

In summary, a plurality of scene data 20 is provided (e.g., the Gibson Database of 3D Spaces) that describes a plurality of scenes (e.g., indoor scenes having rooms and objects in the rooms). A plurality of scene graphs 30 are derived based on scene data 20 that represent the plurality of scenes. Each scene graph 30 comprises a plurality of nodes and a plurality of edges interconnecting the plurality of nodes. The plurality of nodes of a respective scene graph represents a plurality of rooms in the respective scene and a plurality of objects in the respective scene. The plurality of edges of the scene graph 30 define spatial relationships between the plurality of rooms and the plurality of objects.

Based on the scene data 20 and the scene graphs 30, natural language prompts 40 are derived that prompt the language model 10 to predict, given a starting room and a target object in the scene, a next node in a sequence of connected nodes (representing rooms or objects) that define a shortest path from the starting room to the target object in the scene. Additionally, based on the scene graphs 30, for each given starting room and target object, a ground truth shortest path 50 from the starting room to the target object in the scene is determined. Together, the natural language prompts 40 and the ground truth shortest paths 50 are used to form finetuning examples (i.e., application-specific training data) which are used to finetune 60 the pretrained language model 10 to provide a finetuned language model 70.

The workflow described herein is advantageous because, by leveraging scene graph representations of widely available 3D scene data, the workflow does not require an agent to execute tasks in realistic environments for the purpose of providing useful training examples. Additionally, the workflow leverages an existing pretrained language model and finetunes the model to provide better performance for the particular visual navigation task. In this manner, it should be appreciated that the workflow requires less training data than methods that train a new model from scratch to perform the visual navigation task.

Exemplary Hardware Embodiment

Figure 2:
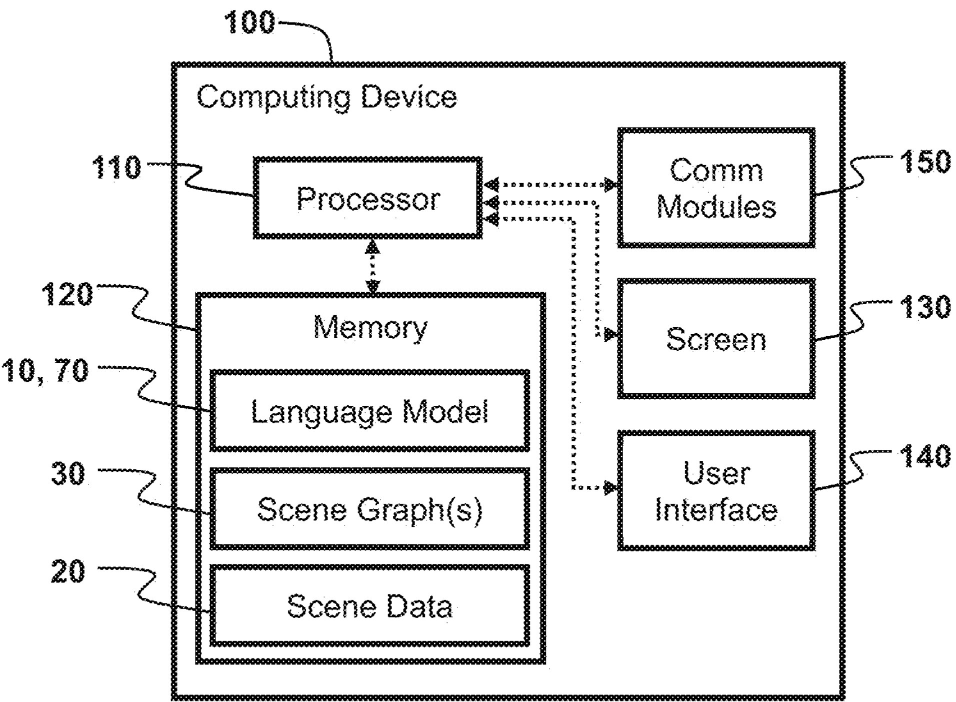
FIG. 2 shows an exemplary embodiment of a computing device that can be used to finetune a pretrained language model for a visual navigation task.

FIG. 2 shows an exemplary embodiment of a computing device 100 that can be used to finetune a pretrained language model 10 for a visual navigation task. Likewise, the computing device 100 might also be used to implement the finetuned language model 70. The computing device 100 comprises a processor 110, a memory 120, a display screen 130, a user interface 140, and at least one network communications module 150. It will be appreciated that the illustrated embodiment of the computing device 100 is only one exemplary embodiment and is merely representative of any of various manners or configurations of a server, a desktop computer, a laptop computer, mobile phone, tablet computer, or any other computing devices that are operative in the manner set forth herein.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be any type of device capable of storing information accessible by the processor 110, such as a memory card, ROM, RAM, hard drives, discs, flash memory, or any of various other computer-readable media serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes an ethernet adaptor or a Wi-Fi® module configured to enable communication with a wired or wireless network and/or router (not shown) configured to enable communication with various other devices. Additionally, the network communications module 150 may include a Bluetooth® module (not shown), as well as one or more cellular modems configured to communicate with wireless telephony networks.

In at least some embodiments, the memory 120 stores program instructions of the language model 10, 70 that are configured to generate natural language outputs in response to natural language prompts. Additionally, the memory 120 stores the scene data 20 and the scene graphs 30 that were derived from the scene data 20.

Methods for Finetuning a Language Model for a Visual Navigation Task

A variety of operations and processes are described below for operating the computing device 100 to finetune a language model for a visual navigation task. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of another computing device to perform the task or function. Additionally, the steps of the methods may be performed in any feasible chronological order, regardless of the order shown in the figures or the order in which the steps are described.

Figure 3:
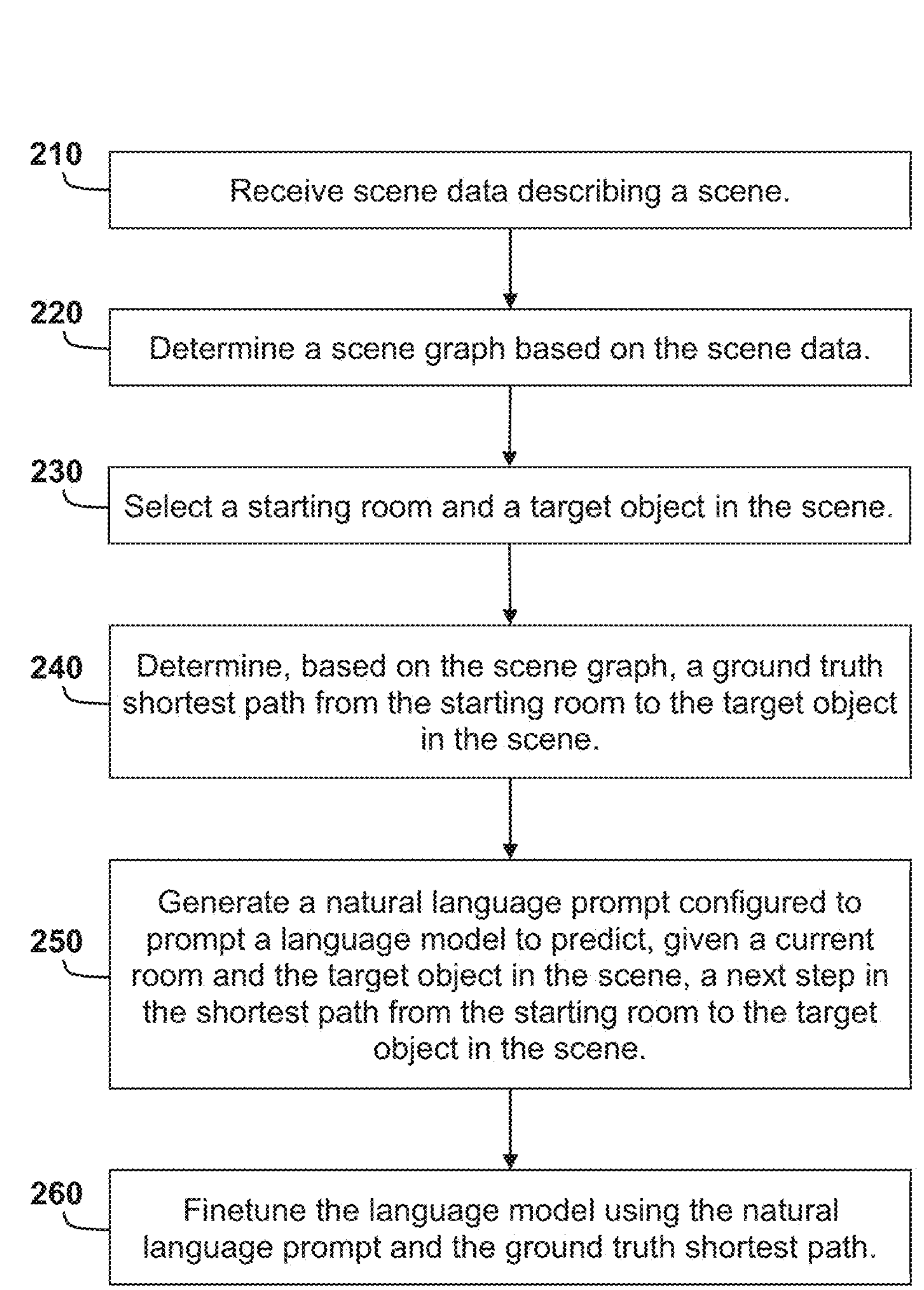
FIG. 3 shows a flow diagram for a method for finetuning a pretrained language model for a visual navigation task.

FIG. 3 shows a flow diagram for a method 200 for finetuning a language model for a visual navigation task. The method 200 advantageously leverages scene graph representations of scene data to generate useable training examples in a cost-effective manner that does not require an agent to execute tasks in realistic environments for the purpose of providing useful training examples. Additionally, the method 200 leverages an existing pretrained language model and finetunes the model to provide better performance for the particular visual navigation task. In this manner, it should be appreciated that the method 200 requires less training data than methods that train a new model from scratch to perform the visual navigation task.

The method 200 begins with receiving scene data describing a scene (block 210). Particularly, the processor 110 receives, e.g., via the network communications module 150 or from the memory 120, a plurality of scene data 20. The plurality of scene data 20 describes a plurality of scenes. In some embodiments, each of the plurality of scenes is an indoor scene, e.g., a building, defined by a plurality of rooms and including a plurality of objects located within the rooms. In at least some embodiments, for each scene, the scene data includes a plurality of room labels that uniquely identify each individual room in the scene and a plurality of object labels that uniquely identify each individual object in the scene. In at least some embodiments, for each respective room and for each respective object, the scene data includes metadata specifying qualitative or quantitative features of the respective room or respective object. The metadata at least includes a location for each respective room and for each respective object within the scene.

In an exemplary embodiment, the plurality of scene data 20 includes data from the Gibson Database of 3D Spaces. The Gibson Database is collected from real indoor spaces using 3D scanning and reconstruction. For each scene (each indoor space), the Gibson Database of 3D Spaces includes a 3D reconstruction of the scene having RGB images, depth information, surface normals, and the like. Additionally, the Gibson Database provides room labels and object labels, as well as a variety of metadata associated with each room and with each object. FIG. 4 shows exemplary metadata that may be included in the scene data 20 with respect to each room and object of a scene. In particular, the exemplary metadata of FIG. 4 corresponds to metadata included with the Gibson Database.

As show in FIG. 4, each room of the scene includes metadata 310 describing, for example, (1) a 2D floor area of the room, e.g., in square meters, (2) an index identifying which floor of the building includes the room, i.e., in the case of a multi-floor building, (3) a unique identifier for the room within the building, (4) 3D coordinates specifying a location of the center of the room, (5) an index identifying which face or side of the building corresponds to the room, (6) a room label indicating a class or category of the room specifying a function of the room, e.g., kitchen, living room, corridor, etc., (7) 3D size dimensions of the room, e.g., X×Y×Z in meters, (8) voxel indices that correspond to the room within a voxel grid of the building, (9) a 3D volume of the room computed from the convex hull of the room, e.g. in cubic meters, and (10) an identifier of the parent building that contains the room.

With continued reference to FIG. 4, each object in the scene includes metadata 320 describing, for example, (1) a list of possible actions/affordances that can be performed with respect to the object, (2) a 2D floor area of the object, e.g., in square meters, (3) a total surface coverage of the object, e.g., in square meters, (4) an object label indicating a class or category of the object, e.g., toy, desk, refrigerator, etc., (5) a unique identifier for the object within the building, (6) 3D coordinates specifying a location of the center of the object, (7) a list of materials from which the object is made of, (8) 3D size dimensions of the object, e.g., X×Y×Z in meters, (9) an index identifying which face or side of the building corresponds to the room within which the object is located, (10) a main tactile texture of the object, if any, (11) a main visible texture of the object, if any, (12) a 3D volume of the object computed from the convex hull of the object, e.g. in cubic meters, (13) voxel indices that correspond to the object within a voxel grid of the building, and (14) an identifier of the parent room that contains the object.

The method 200 continues with determining a scene graph based on the scene data (block 220). Particularly, the processor 110 determines a plurality of scene graphs 30 based on the scene data 20. For each respective scene described in the scene data 20, the processor 110 determines a respective scene graph that represents the respective scene. The processor 110 stores the generated scene graphs 30 in the memory 120. In at least some embodiments, the processor 110 stores the metadata from the scene data 20 for each room and object in association with the respective room nodes and object nodes. The metadata associated with each respective node includes qualitative or quantitative features of the respective room or respective object represented by the respective node. As will be discussed in greater detail, the scene graphs 30 will be used as a source for generating training prompts and corresponding ground truth information for finetuning the language model 10.

Figure 5:
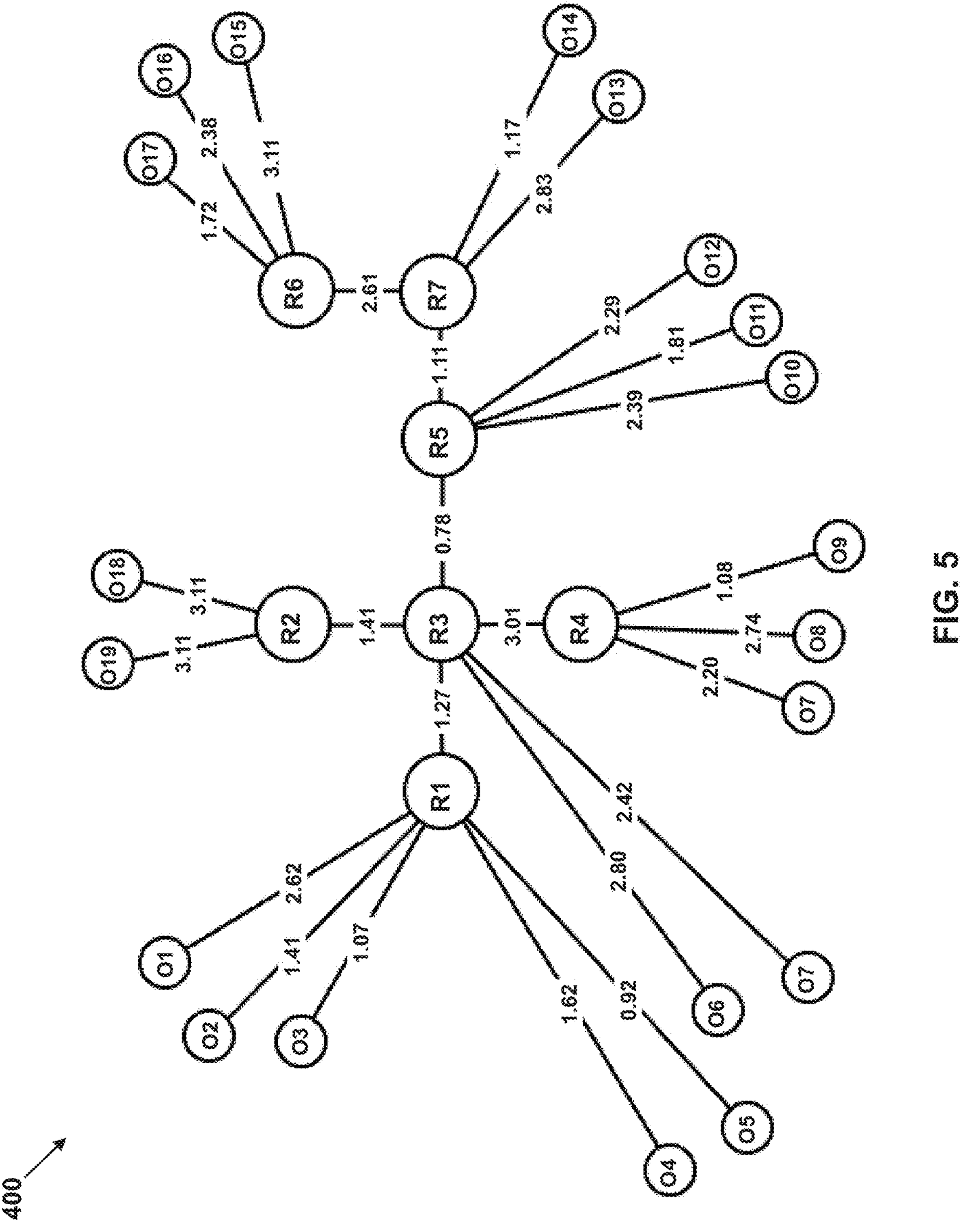
FIG. 5 shows an exemplary scene graph including room nodes and object nodes.

Each scene graph 30 comprises a plurality of nodes and a plurality of edges interconnecting the plurality of nodes. The plurality of nodes of a respective scene graph represents a plurality of rooms in the respective scene and a plurality of objects in the respective scene. More particularly, the plurality of nodes includes respective room nodes corresponding to each of the plurality of rooms and respective object nodes corresponding to each of the plurality of objects. FIG. 5 shows an exemplary scene graph 400 including room nodes R1-R7 and object nodes O1-O19, which are represented by circles in the illustration. The nodes are interconnected by edges, represented by lines in the illustration.

The plurality of edges of the scene graph 30 define spatial relationships between the plurality of rooms and the plurality of objects. Particularly, in some embodiments, the scene graph includes respective edges that connect each respective room node to further room nodes that correspond to a predetermined number of nearest neighboring rooms and/or to all directly connected rooms. In one embodiment, each respective edge that connects two respective room nodes has a length equal to a distance between the centers of the two corresponding rooms. Additionally, in some embodiments, the scene graph includes respective edges that connect each respective object node to a respective room node corresponding to the room within which the corresponding object is located. In one embodiment, each respective edge that connects an object node and a room node a length equal to a distance between the corresponding object and a center of the corresponding room. With reference again to FIG. 5, the length of each edge is indicated by a number superimposed upon the line representing the edge in the illustration.

The processor 110 generates a scene graph 30 for a respective scene described in the scene data 20 by defining respective room nodes corresponding to each room in the respective scene and, likewise, by defining respective object nodes corresponding to each object in the respective scene. Next, the processor 110 defines edges connecting each room node to room nodes corresponding to a predetermined number of nearest neighboring rooms and/or to all directly connected rooms. For each edge, the processor 110 determines a length of the edge as a distance, e.g., Euclidean distance, between the centers of the two corresponding rooms. Next, the processor 110 defines edges connecting each object node to a room node corresponding to the room within which the corresponding object is located. For each edge, the processor 110 determines a length of the edge as a distance, e.g., Euclidean distance, between the center of the corresponding object and the center of the corresponding room.

The method 200 continues with selecting a starting room and a target object in the scene (block 230). Particularly, on the basis of the scene graphs 30, a plurality of finetuning examples will be generated in the form of finetuning prompts that are provided to the language model 10 that prompt the language model 10 to predict, given a current room (e.g., a starting room) and a target object in the scene, a next node in the sequence of connected nodes that define a shortest path from the starting room to the target object in the scene.

To this end, for each of a plurality of finetuning examples, the processor 110 first selects a respective scene graph from the scene graphs 30. Next, the processor 110 selects a starting room from the respective scene and a target object in the respective scene and/or, equivalently, the processor 110 selects a starting room node from the respective scene graph and a target object node from the respective scene graph. In each case, the processor 110 selects the starting room and target object randomly or procedurally. In some embodiments, the target object may correspond to an object type (e.g., any coffee mug in the scene). Alternatively, the target object may correspond to a particular object (e.g., coffee_mug_3) in the scene or particular object node in the scene graph.

The method 200 continues with determining, based on the scene graph, a ground truth shortest path from the starting room to the target object in the scene (block 240). Particularly, for each of the plurality of finetuning examples, the processor 110 determines, based on the scene graph, a ground truth shortest path from the starting room to the target object in the scene. The ground truth shortest path is defined by a sequence of connected nodes in the scene graph that represent a sequence of navigation steps to navigate the scene from the starting room to the target object with the shortest distance or the smallest number of steps. FIG. 6 shows exemplary outputs 500 during the finetuning process. The outputs 500 include a ground truth shortest path 510 formed by the sequence of nodes ["room_5", "room_3", "room_14", "object_24"], having a path length equal to ~10.5 meters.

In one embodiment, the processor 110 determines the ground truth shortest path by first identifying all object nodes in the respective scene graph that match the target object type. Next, the processor 110 calculates a shortest path though the scene graph (i.e., along edges in the scene graph) from the starting room node to each of the identified object nodes. Finally, the processor 110 selects the shortest of the calculated shortest paths as the ground truth shortest path corresponding to the particular starting node and target object. In at least one embodiment, the processor 110 calculates each shortest path as the path between the starting room and the target object having a shortest length, determined as a sum of the edge lengths along the path. In at least one embodiment, the processor 110 calculates each shortest path as the path between the starting room and target object having a fewest number of steps, determined as a count of the nodes along the path.

The method 200 continues with generating a natural language prompt configured to prompt a language model to predict, given a current room and the target object in the scene, a next step in the shortest path from the starting room to the target object in the scene (block 250). Particularly, the processor 110 generates a natural language prompt configured to prompt the language model 10 to predict, given a current room (e.g., the starting room or a subsequent room along a navigation path) and the target object in the scene, a next node in the sequence of connected nodes that define the shortest path from the starting room to the target object in the scene. To this end, the processor 110 generates a text encoding of an incomplete portion of the scene graph, text indicating the current room, and text indicating the target object.

FIG. 7 shows an exemplary natural language prompt 600 for prompting the language model 10. The natural language prompt 600 includes several component parts. First, the natural language prompt 600 includes prompt information 610 having text that describes the visual navigation task that is to be performed by the language model with respect to a scene graph and that describes the nature of the scene graph itself. Second, the natural language prompt 600 includes objective information 620 having text indicating the target object (i.e., 'an object in the category "chair"'). Third, the natural language prompt 600 includes starting information 630 having text indicating a current room (i.e., 'current place is room_9'). The current room may be the starting room or a subsequent room along a navigation path. The starting information 630 includes the metadata associated with a current room node of the respective scene graph 30.

Fourth, the natural language prompt 600 includes scene information 640 having a text encoding of an incomplete portion of the scene graph that is connected to the current room node. Particularly, in some embodiments, the scene information 640 only includes the metadata associated with a subset of nodes in the respective scene graph 30 that are connected to the room node corresponding to the current room. Thus, it should be appreciated that the natural language prompt 600 does not include information describing the entire scene graph. Instead, the starting information 630 and the scene information 640 form an incomplete portion of the scene graph and include the metadata describing only the nodes thereof.

It should also be appreciated that the particular natural language text that is included in the natural language prompt can take any number of forms that adequately convey the prompt information 610, the objective information 620, the starting information 630, and the scene information 640. In some embodiments, the processor 110 utilizes the same text or structure for every natural language prompt of the plurality of finetuning examples, but utilize multiple different variations in a random or procedural manner.

In at least some embodiments, for a given starting room and target object, the processor 110 generates a sequence of natural language prompts that are used sequentially to prompt the language model to determine an entire path from the starting room to the target object. To this end, in a first natural language prompt the current room is the selected starting room. However, in a subsequent second natural language prompt, the current room is a ground truth next node that is responsive to the first natural language prompt. Likewise, in a subsequent third natural language prompt, the current room is a ground truth next node that is responsive to the second natural language prompt. Each prompt in the sequence of prompts is similarly constructed until the target object is reached.

The method 200 continues with finetuning the language model using the natural language prompt and the ground truth shortest path (block 260). Particularly, the processor 110 finetunes the language model 10 using the natural language prompts and the ground truth shortest paths. It will be appreciated by those of skill in the art that finetuning refers to a process of further refining the parameters of a pretrained machine learning model (e.g., the pretrained language model 10) using a smaller set of more targeted training data. In this way, the machine learning model maintains the capabilities learned in the pre-training stage, while being adapted to provide better performance in the targeted use case of the training data used in the finetuning process.

To these ends, for each natural language prompt of each of the plurality of finetuning examples, the processor 110 determines, based on the ground truth shortest path, a ground truth next node that is responsive to the respective natural language prompt. Next, the processer 110 forms the plurality of finetuning examples, in each case, from a natural language prompt and the ground truth next node that is responsive to the natural language prompt. Using these finetuning examples, the processor 110 finetunes the parameters of the pre-trained language model 10 to arrive at a finetuned language model 70 that has improved performance with respect to the visual navigation task.

As discussed above, the language model 10 may take the form of a OpenAI's ChatGPT, e.g., GPT-3.5, GPT-3.5-turbo, or GPT-4. In such embodiments, the processor 110 may compile the finetuning examples into a suitable format (e.g., JSON format) and operate the network communications module 150 to upload the finetuning examples to a remote server, using OpenAI's finetuning APIs. In this way, it should be appreciated that in some embodiments, at least part of the finetuning process is performed by a remote cloud server that is distinct from the computing device 100.

In at least one embodiment, the processor 110 forms the finetuning examples to leverage a self-correction, self-critic, or self-critique algorithm or function of the language model 10 or its development platform. To these ends, the processor 110 modifies the natural language prompts of each finetuning example to further prompt the model to explain why the ground truth response is the correct response. In some embodiments, the processor 110 generates text indicating the ground truth next node and forms a modified natural language prompt by combining the text indicating the ground truth next node with the original natural language prompt. Next, the processor 110 finetunes the language model 10 using the modified natural language prompt. In this way, the prompts let the language model 10 guide its own reasoning toward the correct response. FIG. 8 shows an exemplary modified natural language prompt 700 for finetuning the pretrained language model 10. The modified natural language prompt 700 includes ground truth information 710 having text indicating which is the ground truth next node (e.g., room_8, because a dining room is most likely to have a chair) and which prompts the language model 10 to explain why the ground truth response is the correct response.

Exemplary Use Cases

It should be appreciated that the finetuned language model 70 can be deployed for the purpose of performing a visual navigation task. In some embodiments, a computing device, which is similar in form to the computing device 100, is configured to generate natural language prompts for the purpose of determining a best choice for navigating a real-world environment. The computing device provides the natural language prompts to the finetuned language model 70 and makes navigation decisions based on the output of the finetuned language model 70. Such a computing device may be incorporated into, for example, a mobile robot that is capable of navigating an indoor environment to perform a task.

In the example of a mobile robot, the mobile robot may include a plurality of sensors configured to capture information about the environment that surrounds the mobile robot. Based on the information gathered about the environment (e.g., an office within a home), the mobile robot generates a scene graph. Scene graphs are effective at providing necessary information to guide the robot for navigation or for more complex planning tasks. The mobile robot leverages the finetuned language model 70 and the scene graph to make more reasonable decisions for the navigation task.

Based on information about the environment and/or scene graph and based on a task that is to be performed, the mobile robot is configured to generate a natural language prompt that is similar in form to the natural language prompt 600 discussed above. The mobile robot queries the finetuned language model 70 using the generated natural language prompt and receives a response. FIG. 9 shows an exemplary output 800 from the finetuned language model 70 in response to the exemplary natural language prompt 600. Based on the output from the finetuned language model 70, the mobile robot makes a navigation decision and operates to physically navigate the environment. As the mobile robot navigates the environment, additional information is gathered about the environment and is used to generate subsequent prompts for the finetuned language model 70. In this way, the mobile robot can leverage the finetuned language model 70 to make more logical navigation decisions and accomplish ambiguous tasks more efficiently and effectively.

Experimental Results

The method 200 was experimentally shown to improve the performance of baseline pretrained language models. In the experiments, a set of 77 scenes from the Gibson database was used for finetuning GPT-3.5-turbo. The finetuned model was compared to the baseline pretrained GPT-4 and GPT-3.5-turbo models. The success rate of the baseline models and of the finetuned model was measured in a success-weighted path length (SPL) according to:

$$\frac{1}{N}\sum_{i=1}^{N} S_i \frac{\ell_i}{\max(p_i, \ell_i)}$$

where $S_i$ is a binary success indicator, $\ell_i$ is the LLM path length, $p_i$ is the ground truth shortest path length, and the success condition is LLM steps<1.5*(shortest_path_steps).

With reference again to FIG. 6, the outputs 500 include a predicted shortest path 520 formed by the sequence of nodes ["room_5", "room_2", "room_4", "room_15", "room_12", "object_22"], having a path length equal to ~13.8 meters. Additionally, the outputs 500 include evaluation metrics 530 indicating an SPL by distance of ~0.8 and an SPL by steps of ~0.67.

As shown in the table below, on the test dataset, the finetuned GPT-3.5-turbo performed significantly better than the baseline pretrained version of GPT-3.5-turbo, and even beat GPT-4 in the SPL metrics.

TABLE 1

| | spl_by_distance | spl_by_steps |
|---|---|---|
| gpt-4 | 0.524 | 0.552 |
| gpt-3.5-turbo | 0.276 | 0.280 |
| gpt-3.5-turbo-finetune | 0.597 | 0.611 |

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for finetuning a language model, the method comprising:

providing, in a memory, a scene graph representing a scene, the scene graph comprising a plurality of nodes and a plurality of edges interconnecting the plurality of nodes, the plurality of nodes representing a plurality of rooms in the scene and a plurality of objects in the scene;

selecting, with a processor, (i) a starting room from the plurality of rooms and (ii) a target object, the target object being an object type or a particular object from the plurality of objects;

determining, with the processor, based on the scene graph, a ground truth shortest path from the starting room to the target object in the scene, the ground truth shortest path being defined by a first sequence of connected nodes in the scene graph that represent a first sequence of navigation steps to navigate the scene from the starting room to the target object;

generating, with the processor, a natural language prompt configured to prompt a language model to predict, given a current room and the target object in the scene, a next node in the first sequence of connected nodes that define the ground truth shortest path from the starting room to the target object in the scene; and finetuning the language model using the natural language prompt and the ground truth shortest path.

2. The method according to claim 1, the providing the scene graph further comprising:

receiving scene data describing the plurality of rooms and the plurality of objects in the scene; and determining the scene graph based on the scene data.

3. The method according to claim 1, wherein the plurality of nodes includes (i) respective room nodes corresponding to each of the plurality of rooms and (ii) respective object nodes corresponding to each of the plurality of objects.

4. The method according to claim 3, wherein the plurality of edges of the scene graph define spatial relationships between the plurality of rooms and the plurality of objects.

5. The method according to claim 4, wherein:

the plurality of edges includes respective edges connecting each respective room node in the plurality of nodes to room nodes in the plurality of nodes that correspond to a predetermined number of nearest neighboring rooms of the plurality of rooms; and each respective edge in the plurality of edges that connects two respective room nodes in the plurality of nodes has a length equal to a distance between the rooms of the plurality of rooms corresponding to the two respective room nodes.

6. The method according to claim 4, wherein:

the plurality of edges includes respective edges connecting each respective object node in the plurality of nodes to a respective room node in the plurality of nodes, the respective object node corresponding to a respective object of the plurality of objects, the respective room node corresponding to the room of the plurality of rooms within which the respective object is located; and each respective edge in the plurality of edges that connects an object node and a room node in the plurality of nodes has a length equal to a distance between the corresponding object of the plurality of objects and a center of the corresponding room of the plurality of rooms.

7. The method according to claim 1, the determining the ground truth shortest path further comprising:

determining the ground truth shortest path as the path between the starting room and the target object having a shortest length.

8. The method according to claim 1, the determining the ground truth shortest path further comprising:

determining the ground truth shortest path as the path between the starting room and the target object having a fewest number of steps.

9. The method according to claim 1, the generating the natural language prompt further comprising:

generating the natural language prompt including (i) a text encoding of an incomplete portion of the scene graph, (ii) text indicating the current room, and (iii) text indicating the target object.

10. The method according to claim 9, wherein the incomplete portion of the scene graph includes (i) a respective node of the plurality of nodes representing the current room and (ii) each node of the plurality of nodes that is connected to the respective node by an edge of the plurality of edges.

11. The method according to claim 9, wherein the text encoding of the incomplete portion of the scene graph includes metadata of each node of the incomplete portion of the scene graph.

12. The method according the claim 11, wherein the metadata of each respective node of the incomplete portion of the scene graph includes qualitative or quantitative features of a respective room or respective object represented by the respective node.

13. The method according to claim 9, wherein the current room is the starting room.

14. The method according to claim 9, wherein the current room is a ground truth next node associated with a previously generated different natural language prompt.

15. The method according to claim 1, the finetuning the language model further comprising:

determining, based on the ground truth shortest path, a ground truth next node that is responsive to the natural language prompt.

16. The method according to claim 15, the finetuning the language model further comprising:

generating text indicating the ground truth next node;

forming a modified natural language prompt by combining the text indicating the ground truth next node with the natural language prompt; and finetuning the language model using the modified natural language prompt.

17. The method according to claim 15, the finetuning the language model further comprising:

transmitting, with a transceiver, the natural language prompt and the ground truth next node to a remote server; and finetuning, at the remote server, the language model based on the natural language prompt and the ground truth next node.

18. The method according to claim 1, wherein the finetuned language model is by a mobile robot to navigate an environment.

19. The method according to claim 18, wherein the mobile robot captures information about the environment and generates further natural language prompts based on the information about the environment.

20. The method according to claim 19, wherein the mobile robot navigates the environment based on outputs of the finetuned language model that are responsive to the further natural language prompts.

* * * * *